United States Patent
Prati et al.

(10) Patent No.: US 11,965,739 B2
(45) Date of Patent: Apr. 23, 2024

(54) MEMS GYROSCOPE HAVING AN IMPROVED REJECTION OF THE QUADRATURE ERROR

(71) Applicant: STMICROELECTRONICS S.r.l., Agrate Brianza (IT)

(72) Inventors: Daniele Prati, Catania (IT); Luca Giuseppe Falorni, Limbiate (IT); Luca Guerinoni, Alzano Lombardo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/868,479

(22) Filed: Jul. 19, 2022

(65) Prior Publication Data
US 2023/0036566 A1 Feb. 2, 2023

(30) Foreign Application Priority Data

Jul. 30, 2021 (IT) .......................... 102021000020504

(51) Int. Cl.
*G01C 19/5712* (2012.01)

(52) U.S. Cl.
CPC ............................... *G01C 19/5712* (2013.01)

(58) Field of Classification Search
CPC ............ G01C 19/5712; G01C 19/5762; G01C 19/5747
See application file for complete search history.

(56) References Cited

U.S. PATENT DOCUMENTS

| | | | |
|---|---|---|---|
| 2005/0072231 A1* | 4/2005 | Chojnacki | G01C 19/5747 73/504.14 |
| 2011/0061460 A1* | 3/2011 | Seeger | G01C 19/574 73/504.12 |
| 2011/0154898 A1* | 6/2011 | Cazzaniga | G01C 19/5747 73/504.12 |
| 2012/0291548 A1* | 11/2012 | Kanemoto | G01C 19/5733 73/504.12 |
| 2013/0167635 A1* | 7/2013 | Su | G01C 19/5747 73/504.12 |
| 2014/0116134 A1* | 5/2014 | Classen | G01C 19/5712 73/504.12 |
| 2015/0268046 A1* | 9/2015 | Takizawa | G01C 19/5747 73/504.12 |
| 2015/0300821 A1 | 10/2015 | Takizawa | |
| 2016/0084654 A1* | 3/2016 | Senkal | G01C 19/5747 73/504.12 |
| 2017/0284804 A1* | 10/2017 | Gattere | G01C 25/00 |

(Continued)

*Primary Examiner* — David J Bolduc
(74) *Attorney, Agent, or Firm* — Seed IP Law Group LLP

(57) ABSTRACT

The MEMS gyroscope is formed by a substrate, a first mass and a second mass, wherein the first and the second masses are suspended over the substrate and extend, at rest, in a plane of extension defining a first direction and a second direction transverse to the first direction. The MEMS gyroscope further has a drive structure coupled to the first mass and configured, in use, to cause a movement of the first mass in the first direction, and an elastic coupling structure, which extends between the first mass and the second mass and is configured to couple the movement of the first mass in the first direction with a movement of the second mass in the second direction. The elastic coupling structure has a first portion having a first stiffness and a second portion having a second stiffness greater than the first stiffness.

20 Claims, 4 Drawing Sheets

(56) References Cited

U.S. PATENT DOCUMENTS

| | | | |
|---|---|---|---|
| 2018/0031602 A1* | 2/2018 | Huang | G01P 15/13 |
| 2018/0031603 A1* | 2/2018 | Huang | G01P 15/097 |
| 2018/0073875 A1* | 3/2018 | Anac | G01C 19/5762 |
| 2018/0283867 A1 | 10/2018 | Ruohio et al. | |
| 2018/0283869 A1 | 10/2018 | Kato | |
| 2018/0340775 A1* | 11/2018 | Kuisma | G01C 19/5642 |
| 2019/0017823 A1* | 1/2019 | Shao | G01C 19/5769 |
| 2019/0383612 A1* | 12/2019 | Geisberger | G01C 19/5747 |
| 2020/0096338 A1* | 3/2020 | Ruohio | G01C 19/5747 |
| 2022/0228864 A1* | 7/2022 | Reinmuth | G01C 19/5719 |
| 2022/0282972 A1* | 9/2022 | Geisberger | G01C 19/5712 |

\* cited by examiner

MEMS GYROSCOPE HAVING AN IMPROVED REJECTION OF THE QUADRATURE ERROR

BACKGROUND

Technical Field

The present disclosure relates to a MEMS gyroscope having an improved rejection of the quadrature error, in particular, relative to a yaw movement.

Description of the Related Art

As is known, a gyroscope obtained with MEMS (Micro-Electro-Mechanical Systems) technology is formed in a die of semiconductor material, for example, silicon, and comprises at least one or more mobile masses suspended over a substrate and free to oscillate with respect to the substrate with one or more degrees of freedom.

The mobile masses are capacitively coupled to the substrate through drive electrodes, which are configured to cause an oscillation of the mobile masses in a driving direction, and detection electrodes, which are configured to detect a displacement of the mobile masses in a detection direction.

When the MEMS gyroscope rotates with an angular velocity about an axis of rotation, a mobile mass that oscillates with a linear velocity in a direction perpendicular to the axis of rotation is subject to a Coriolis force directed in a direction perpendicular to the axis of rotation and to the direction of the linear velocity.

In particular, MEMS gyroscopes of a uniaxial, biaxial, or triaxial type are known, which are configured to detect a yaw movement associated with a yaw angular velocity of the MEMS gyroscope about an axis perpendicular to a plane of extension of the mobile mass.

In this regard, MEMS gyroscopes with two detection masses are known. These MEMS gyroscopes comprise a first mobile mass, a second mobile mass and an elastic element that couples the first and the second mobile masses. The first mobile mass is kept in oscillation by the drive electrodes in the driving direction, which lies in the plane of extension of the first and the second mobile masses. The elastic element is configured to transform the oscillation of the first mobile mass into an oscillation of the second mobile mass in an induced direction, which lies in the plane of extension of the first and the second mobile masses and is perpendicular to the driving direction. Consequently, when the MEMS gyroscope is subject to a yaw angular velocity, the second mobile mass is affected by a Coriolis force in a direction perpendicular to the induced direction (and parallel to the driving direction). The detection electrodes are configured to detect the yaw movement of the second mobile mass and generate a corresponding detection signal.

A key parameter that determines the performance of a MEMS gyroscope is the stability of the detection signal in the absence of rotation (Zero Rate Output, ZRO). In other words, it is desired that, in the absence of rotations of the MEMS gyroscope, when the first mobile mass is actuated in the driving direction, the movement of the second mobile mass does not generate any variation in the detection signal.

However, in known MEMS gyroscopes, because of the process variability associated with manufacturing of the elastic coupling elements between the first and the second mobile masses, the elastic coupling elements have asymmetries. This means that the induced direction also comprises a quadrature component parallel to the driving direction (and perpendicular to the induced direction). The quadrature component therefore generates a variation of the detection signal, also known as quadrature error, even in the absence of rotations of the MEMS gyroscope.

An approach used for reducing the asymmetries of the elastic coupling elements envisages that, in the process of manufacturing the MEMS gyroscope, dedicated lithographic machinery and/or masks are used, capable of reducing the process variability.

However, this approach entails an increase in costs and times for manufacturing the MEMS gyroscope.

According to another approach, additional electrodes, configured to compensate the quadrature error, are also integrated in the MEMS gyroscope.

However, the additional electrodes may increase an occupation of die area and require additional manufacturing steps. Consequently, also this approach entails an increase in the difficulties and manufacturing times and costs of the MEMS gyroscope.

Moreover, the quadrature compensation electrodes entail a greater complexity of design of a control circuit of the MEMS gyroscope.

BRIEF SUMMARY

The present disclosure is to overcome the disadvantages of the known art.

In at least one embodiment, a MEMS gyroscope includes a substrate; a first mass and a second mass, the first mass and the second mass being suspended over the substrate and extending, at rest, in a plane of extension defining a first direction and a second direction transverse to the first direction; a drive structure coupled to the first mass and configured, in use, to cause a movement of the first mass in the first direction; and an elastic coupling structure extending between the first mass and the second mass and configured to couple the movement of the first mass in the first direction with a movement of the second mass in the second direction, wherein the elastic coupling structure comprises a first portion having a first stiffness and a second portion having a second stiffness, the second stiffness being greater than the first stiffness.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein.

DETAILED DESCRIPTION

Figure 1:
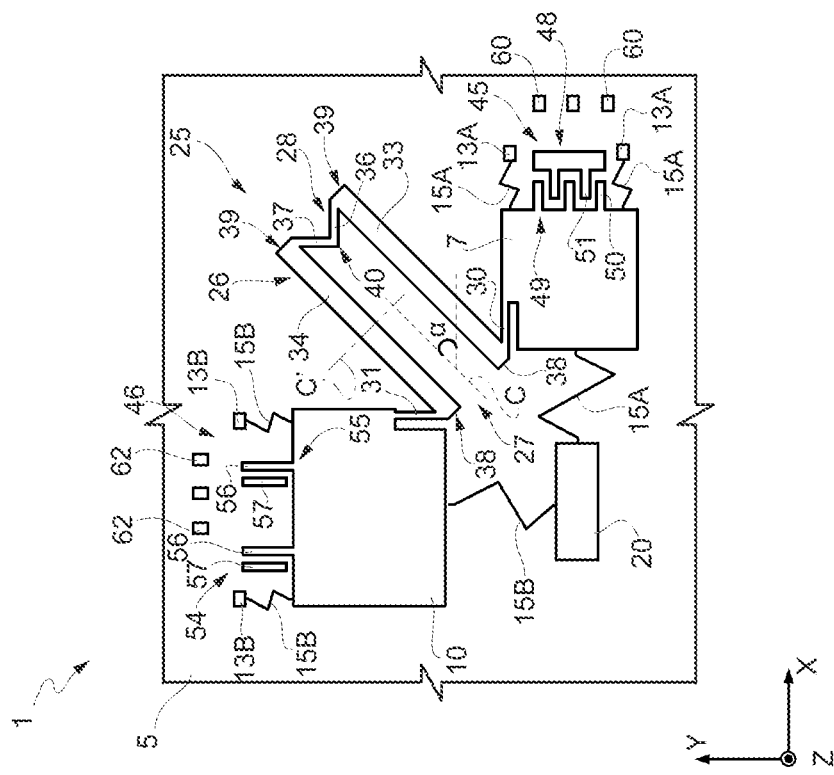
FIG. 1 shows a top view of the present MEMS gyroscope, according to one embodiment.

FIG. 1 shows a MEMS gyroscope 1 of a uniaxial type in a cartesian reference system XYZ comprising a first, a second and a third axis X, Y, Z.

The MEMS gyroscope 1 is obtained in a die of semiconductor material, for example, silicon, and comprises a substrate 5, and a first mobile mass 7 and a second mobile mass 10, which are suspended over the substrate 5.

The first and the second mobile masses 7, 10 are substantially planar, with main extension in a plane XY, and here have an approximately rectangular shape.

The first and the second mobile masses 7, 10 are coupled, respectively, to first and second anchorage regions 13A, 13B, fixed to the substrate 5, by means of first elastic connections (flexures) 15A and second elastic connections (flexures) 15B, respectively.

The first flexures 15A each extend between the first mobile mass 7 and a respective first anchorage region 13A, here in a direction parallel to the first axis X.

The second flexures 15B each extend between the second mobile mass 10 and a respective second anchorage region 13B, here in a direction parallel to the second axis Y.

Furthermore, in this embodiment, the first and the second mobile masses 7, 10 are also coupled to a central anchorage region 20, fixed to the substrate 5, via a respective first flexure 15A and a respective second flexure 15B.

The first and the second flexures 15A, 15B may be linear or folded elastic elements and are configured, in a per se known manner, to enable movement of the first mobile mass 7 and, respectively, of the second mobile mass 10 with one or more degrees of freedom.

In detail, in this embodiment, the first and the second flexures 15A, 15B enable movement of the first and of the second mobile masses 7, 10, respectively, along the first axis X and along the second axis Y.

The MEMS gyroscope 1 comprises an elastic coupling structure 25 that extends between, and couples together, the first and the second mobile masses 7, 10.

The coupling structure 25 is formed by a stiff portion 26, a peripheral compliant portion 27, and a central compliant portion 28.

The stiff portion 26 has a stiffness greater than the peripheral compliant portion 27 and the central compliant portion 28, for example by a factor comprised between 10 and 100.

The peripheral compliant portion 27 comprises a first arm 30, extending from the first mobile mass 7 in a direction parallel to the first axis X, and a second arm 31, extending from the second mass 10 in a direction parallel to the second axis Y.

The stiff portion 26 comprises a first connection arm 33 and a second connection arm 34 each extending between a respective first end 38, coupled to the peripheral compliant portion 27, and a respective second end 39, coupled to the central compliant portion 28.

In detail, the first end 38 of the first and the second connection arms 33, 34 is coupled to an end of the first and, respectively, the second arms 30, 31 of the peripheral compliant portion 27.

The first and the second connection arms 33, 34 extend from the respective first end 38 in a direction parallel to an inclined direction C (here represented by a dashed line), in the plane XY, transverse to the first and the second axes X, Y, forming an angle α with respect to the first axis X, here an angle of 45°.

The first and the second arms 30, 31 of the peripheral compliant portion 27 have smaller dimensions than the first and the second connection arms 33, 34 so as to have a greater compliance than the first and the second connection arms 33, 34.

In detail, in this embodiment, the first arm 30 of the peripheral compliant portion 27 and the second arm 31 of the peripheral compliant portion 27 each have a respective width, measured, respectively, in a direction parallel to the second axis Y and in a direction parallel to the first axis X, that is smaller than a width of the first and the second connection arms 33, 34 measured in the plane XY in a direction parallel to a direction C' (represented by a dashed-and-dotted line in FIG. 1) perpendicular to the inclined direction C.

For instance, the width of the first and the second arms 30, 31 of the peripheral compliant portion 27 may be comprised between one tenth and one hundredth of the width of the first and the second connection arms 33, 34.

Furthermore, in this embodiment, the first arm 30 of the peripheral compliant portion 27 and the second arm 31 of the peripheral compliant portion 27 each have a respective length, measured, respectively, in a direction parallel to the first axis X and in a direction parallel to the second axis Y, which is smaller than a length of the first and the second connection arms 33, 34 measured in a direction parallel to the inclined direction C.

For instance, the length of the first and the second arms 30, 31 of the peripheral compliant portion 27 may be comprised between one tenth and one hundredth of the length of the first and the second connection arms 33, 34.

In this embodiment, the first and the second arms 30, 31 of the peripheral compliant portion 27 have a thickness, along the third axis Z, equal to the thickness of the first and the second connection arms 33, 34.

However, the thickness of the first and/or of the second arms 30, 31 of the peripheral compliant portion 27 may also be different from the thickness of the first and/or of the second connection arms 33, 34.

The central compliant portion 28 comprises a first arm 36 and a second arm 37, coupled together at a joint end 40. For example, as shown in FIG. 1 the first arm 36 and the second arm 37 meet at the joint end 40 such that the central compliant portion 28 has a V-shape, and the joint end 40 of the V-shape extends inwards towards a central anchor region as shown in FIG. 1.

The first arm 36 of the central compliant portion 28 extends in a direction parallel to the first axis X, between the joint end 40 and the second end 39 of the first connection arm 33.

The second arm 37 of the central compliant portion 28 extends in a direction parallel to the second axis Y, between the joint end 40 and the second end 39 of the second connection arm 34.

The first and the second arms 36, 37 of the central compliant portion 28 have smaller dimensions than the first and the second connection arms 33, 34 so as to have a greater compliance than the first and the second connection arms 33, 34.

In detail, in this embodiment, the first arm 36 of the central compliant portion 28 and the second arm 34 of the central compliant portion 28 each have a respective width, measured, respectively, parallel to the second axis Y and parallel to the first axis X, that is smaller than the width of the first and the second connection arms 33, 34 measured in the plane XY parallel to the direction C'.

For instance, the width of the first and the second arms 36, 37 of the central compliant portion 28 may be comprised between one tenth and one hundredth of the width of the first and the second connection arms 33, 34.

Moreover, in this embodiment, the first arm 36 of the central compliant portion 28 and the second arm 37 of the central compliant portion 28 each have a respective length, measured, respectively, parallel to the first axis X and parallel to the second axis Y, that is smaller than the length of the first and the second connection arms 33, 34 measured parallel to the inclined direction C.

For instance, the length of the first and the second arms 36, 37 of the central compliant portion 28 may be comprised between one tenth and one hundredth of the length of the first and the second connection arms 33, 34.

In this embodiment, the first and the second arms 36, 37 of the central compliant portion 28 have a thickness, along the third axis Z, equal to the thickness of the first and the second connection arms 33, 34.

However, the thickness of the first and/or of the second arms 36, 37 of the central compliant portion 28 may also be different from the thickness of the first connection arm 33 and/or of the second connection arm 34.

The MEMS gyroscope 1 also comprises a drive structure 45 of a capacitive type and coupled to the first mobile mass 7, and a detection structure 46 of a capacitive type and coupled to the second mobile mass 10.

The drive structure 45 comprises a fixed electrode 48, fixed to the substrate 5, and a mobile electrode 49, integral with respect to the first mobile mass 7.

In this embodiment, the drive structure 45 is a comb fingered capacitor. In detail, the mobile electrode 49 comprises a plurality of protrusions 50 extending from the first mobile mass 7 parallel to the first axis X and the fixed electrode 48 comprises a plurality of protrusions 51 extending parallel to the first axis X and are interdigitated with respect to the protrusions 50 of the mobile electrode 49.

However, the drive structure 45 may have a shape different from the one illustrated in FIG. 1. For instance, the number, shape, and arrangement of the fixed electrode 48 and of the mobile electrode 49 may vary. In addition or as an alternative, the drive structure 45 may be a parallel-plate capacitor.

The detection structure 46 is configured to detect a yaw movement, parallel to the first axis X, of the second mobile mass 10 and generate a corresponding yaw output signal.

In detail, the detection structure 46 comprises a fixed electrode 54, fixed to the substrate 5, and a mobile electrode 55, integral with respect to the second mobile mass 10.

In this embodiment, the detection structure 46 is a capacitor with a parallel-plate structure. In detail, the mobile electrode 55 comprises a plurality of protrusions 56 extending from the second mobile mass 10 parallel to the second axis Y, and the fixed electrode 54 comprises a plurality of fixed portions 57 extending parallel to the second axis Y, each at a distance along the first axis X from a respective protrusion 56.

However, the detection structure 46 may have a shape different from the one illustrated in FIG. 1. For instance, the number, shape, and arrangement of the fixed electrode 54 and of the mobile electrode 55 can vary. In addition or as an alternative, the detection structure 46 may be a comb fingered capacitor.

The MEMS gyroscope 1 further comprises drive contact pads 60 and detection contact pads 62, which are electrically coupled to the drive structure 45 and to the detection structure 46, respectively, through respective connection tracks (here not illustrated).

The drive contact pads 60 and the detection contact pads 62 enable coupling of the MEMS gyroscope 1 to an external control circuit (here not illustrated). The external control circuit may be obtained in the same die as that of the MEMS gyroscope 1 or in a separate die.

Figure 2:
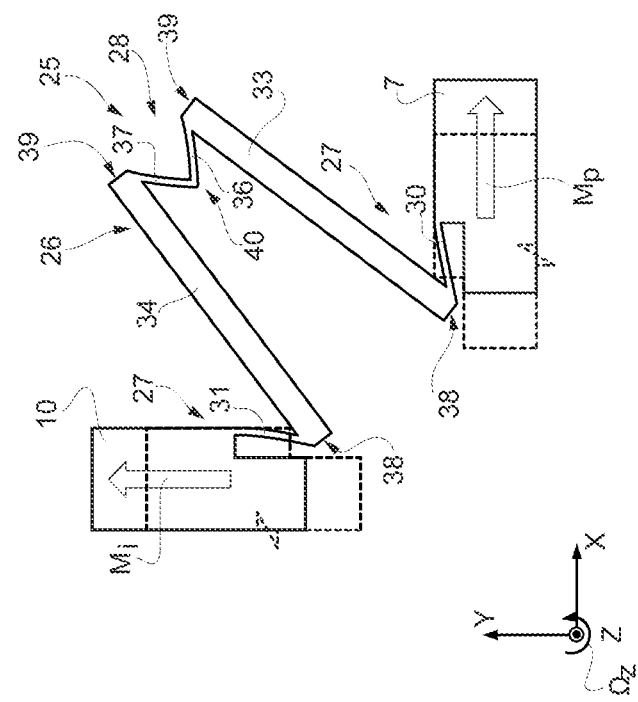
FIG. 2 shows a top view of a portion of the MEMS gyroscope of FIG. 1, in use.

In use, a driving voltage is applied to the drive structure 45. The driving voltage causes a movement of the first mobile mass 7 in a primary driving direction $M_p$ parallel to the first axis X, for example, an oscillation at a resonance frequency of the MEMS gyroscope 1. By way of example, FIG. 2 shows a simplified and enlarged detail of the MEMS gyroscope 1, in which the first mobile mass 7 is shifted in the primary driving direction $M_p$, here to the right, with respect to a rest position (indicated for clarity by a dashed line).

The elastic coupling structure 25 undergoes deformation in response to the movement of the first mobile mass 7.

In detail, the peripheral compliant portion 27 and the central compliant portion 28 undergo deformation so that the first ends 38 of the first and the second connection arms 33, 34 move away from one another, and the second ends 39 of the first and the second connection arms 33, 34 approach one another.

To a first approximation, the first and the second connection arms 33, 34 do not undergo deformation, since they have a much greater stiffness than the arms 30, 31 and 36, 37, respectively, of the peripheral compliant portion 27 and of the central compliant portion 28, and undergo a rotation in the plane XY, about an axis parallel to the third axis Z.

Displacement of the first end 38 of the second connection arm 34 causes a movement of the second mobile mass 10 in an induced driving direction $M_i$, perpendicular to the primary driving direction $M_p$ and parallel to the second axis Y (upwards in the example of FIG. 2).

Furthermore, the first and the second arms 30, 31 of the peripheral compliant portion 27 undergo deformation so as to compensate spurious movements of the first and the second mobile masses 7, 10 along directions transverse, respectively, to the first and the second axes X, Y. In practice, the first mobile mass 7 undergoes only a displacement in the primary driving direction $M_p$, and the second mobile mass 10 undergoes only a displacement in the induced driving direction $M_i$.

Moreover, the Applicant has verified that the first and the second connection arms 33, 34, which extend transverse to the first and the second axes X, Y, i.e., in a direction transverse to the primary driving direction $M_p$ and to the induced driving direction $M_i$, may be subject to a greater process variability than the arms 30, 31 and 36, 37 of the peripheral compliant portion 27 and of the central compliant portion 28, respectively, which extend in a direction parallel to the first and the second axes X, Y.

In fact, during the lithographic steps used for defining the coupling structure 25, known lithographic machinery may cause a lower accuracy of definition of the portions of the coupling structure 25 that extend in specific directions.

Consequently, the dimensions of these portions of the coupling structure 25 may be subject to a greater process variability, which could cause a high variability also in the respective elastic deformation properties.

By increasing the stiffness of the portions of the MEMS gyroscope 1 that are subject to a greater process variability, it is possible to compensate the impact of this process variability on the performance of the MEMS gyroscope 1.

In practice, the fact that the first and the second connection arms 33, 34 have a stiffness greater than that of the arms 30, 31 and 36, 37 of the peripheral compliant portion 27 and of the central compliant portion 28, respectively, and therefore to a first approximation do not undergo deformation, in use, entails that the coupling between the movement in the primary driving direction $M_p$ and the induced driving direction $M_i$ is not affected by any possible asymmetries due to process variability.

Consequently, when the MEMS gyroscope 1 is not subject to the yaw angular velocity $\Omega_z$ about the third axis Z, the second mobile mass 10 does not move, to a first approximation, along the first axis X, and the detection structure 54 does not detect any variation of capacitance associated with a yaw movement.

In other words, to a first approximation, the coupling structure 25 enables rejection of the quadrature error associated with the yaw movement. Consequently, the MEMS gyroscope 1 has a high stability of the yaw output signal.

This entails that the MEMS gyroscope 1 can have a stable output signal even without incorporating additional quadrature error compensation electrodes, which would involve an increase in complexity of the control circuit of the MEMS gyroscope 1.

Furthermore, the process for manufacturing the MEMS gyroscope 1 does not require dedicated lithographic machinery or masks to improve rejection of the yaw quadrature error. Consequently, the MEMS gyroscope 1 can keep manufacturing costs low and manufacturing times short.

Figure 3:
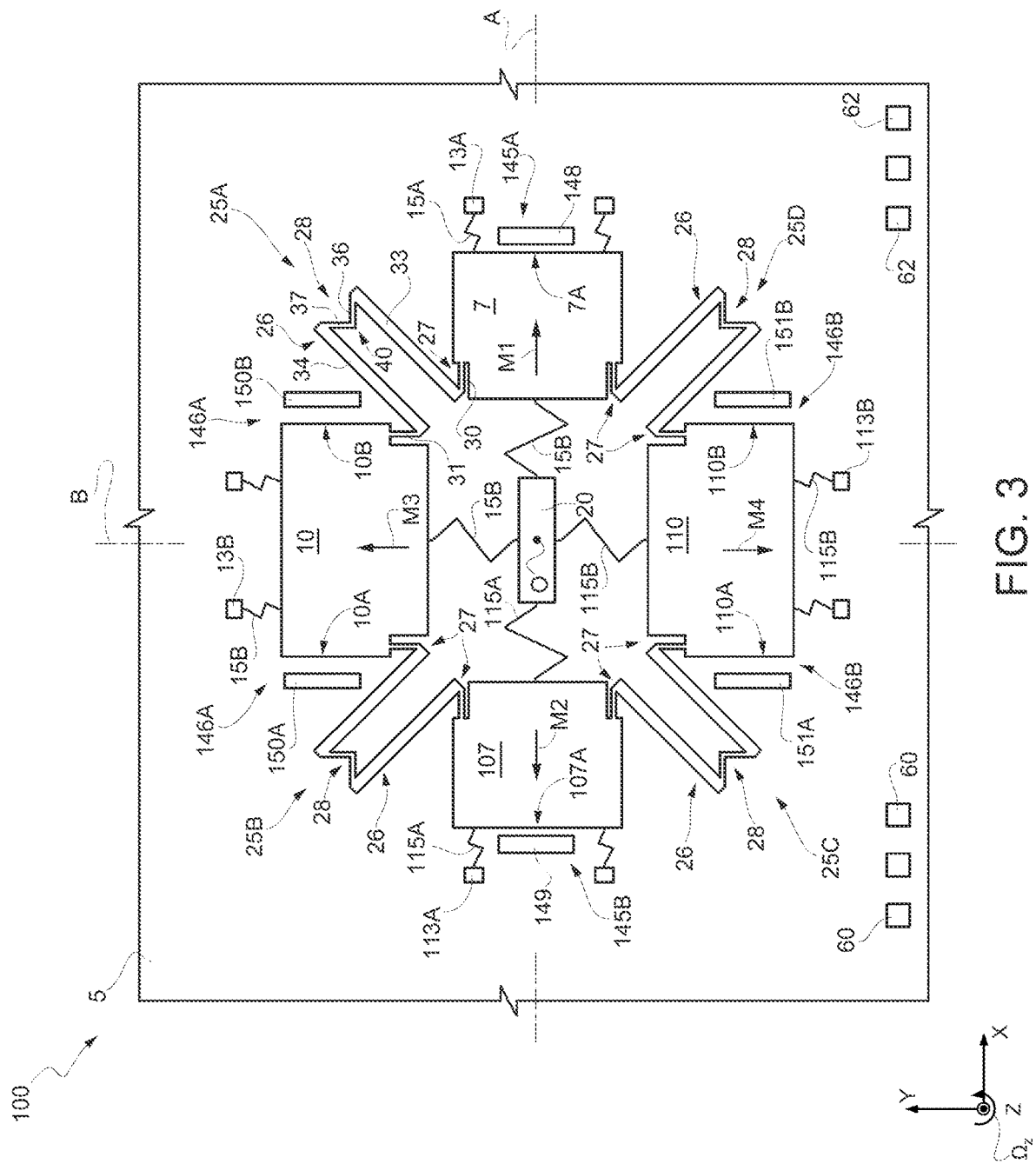
FIG. 3 shows a top view of the present MEMS gyroscope, according to a different embodiment.

FIG. 3 shows a different embodiment of the present MEMS gyroscope, here designated by 100. Also the MEMS gyroscope 100 is of a uniaxial type, configured to detect a yaw angular velocity of the MEMS gyroscope 100, and has a general structure similar to that of the MEMS gyroscope 1 of FIG. 1; consequently, elements in common are designated by the same reference numbers and are not described any further.

The MEMS gyroscope 100 has a structure substantially symmetrical with respect to two central axes A, B passing through a center O of the MEMS gyroscope 100 and parallel to the first and the second axes X, Y, respectively.

The MEMS gyroscope 100 comprises the substrate 5 and four mobile masses suspended over the substrate 5, here referred to as first mobile mass 7, second mobile mass 10, third mobile mass 107, and fourth mobile mass 110.

The first and the third mobile masses 7, 107 are arranged symmetrically with respect to the second central axis B and are coupled, respectively, to the first anchorage regions 13A and to third anchorage regions 113A, by the first flexures 15A and third flexures 115A, respectively.

The third flexures 115A are equal to the first flexures 15A, here arranged symmetrically thereto with respect to the second central axis B, and extend parallel to the first axis X, each between a respective third anchorage region 113A and the third mobile mass 10.

The second and the fourth mobile masses 10, 110 are arranged symmetrically with respect to the first central axis A and are coupled, respectively, to the second anchorage regions 13B and to fourth anchorage regions 113B, by the second flexures 15B and fourth flexures 115B, respectively.

The fourth flexures 115B are equal to the second flexures 15B, here arranged symmetrically thereto with respect to the first central axis A, and extend parallel to the second axis Y, each between a respective fourth anchorage region 113B and the fourth mobile mass 110.

Also in this embodiment, the first, the second, the third, and the fourth mobile masses 7, 10, 107, 110, are coupled to a central anchorage region 20, respectively, by a first flexure 15A, a second flexure 15B, a third flexure 115A, and a fourth flexure 115B.

The MEMS gyroscope 100 further comprises four coupling structures 25A-25D, also referred to as hereinafter as first, second, third, and fourth coupling structures 25A, 25B, 25C, 25D.

The coupling structures 25A-25D are each equal to the coupling structure 25 of the MEMS gyroscope 1 of FIG. 1 and are mutually arranged symmetrically with respect to the first and the second central axes A, B.

In detail, the first coupling structure 25A is symmetrical to the second coupling structure 25B with respect to the second central axis B and to the fourth coupling structure 25D with respect to the first central axis A. The third coupling structure 25C is symmetrical to the second coupling structure 25B with respect to the first central axis A and to the fourth coupling structure 25D with respect to the second central axis B.

The first coupling structure 25A extends between the first and the second mobile masses 7, 10. The second coupling structure 25B extends between the second and the third mobile masses 10, 107. The third coupling structure 25C extends between the third and the fourth mobile masses 107, 110. The fourth coupling structure 25D extends between the fourth and the first mobile masses 110, 7.

Also here, the coupling structures 25A-25D each comprise a stiff portion 26, a peripheral compliant portion 27, and a central compliant portion 28, as discussed above and not described any further herein.

The MEMS gyroscope 100 comprises a first drive structure 145A and a second drive structure 145B of a capacitive type, which are coupled, respectively, to the first and the third mobile masses 7, 107, and a first detection structure 146A and a second detection structure 146B of a capacitive type, which are coupled to the second and the fourth mobile masses 10, 110, respectively.

In this embodiment, the first and the second drive structures 145A, 145B each form a respective parallel-plate capacitor configured to cause a movement of the first mobile mass 7 and of the third mobile mass 107, respectively, along the first axis X.

In detail, the first drive structure 145A comprises a fixed electrode 148 arranged at a distance along the first axis X from a mobile electrode, which is fixed with respect to the first mobile mass 7, in particular here formed by a wall 7A of the first mobile mass 7 facing the fixed electrode 148.

The second drive structure 145B comprises a fixed electrode 149 arranged at a distance along the first axis X from a mobile electrode, which is fixed with respect to the third mobile mass 107, in particular here formed by a wall 107A of the third mobile mass 107 facing the fixed electrode 149.

However, the first and the second drive structures 145A, 145B may have a shape different from the one illustrated in FIG. 3. For instance, the number, shape, and arrangement of the fixed electrodes 148, 149 and of the mobile electrode 7A, 107A may vary. In addition or as an alternative, the first and the second drive structures 145A, 145B may be interdigitated capacitors.

Also the first and the second detection structures 146A, 146B each form a respective parallel-plate capacitor and are configured to detect a movement of the second mobile mass 10 and of the fourth mobile mass 110, respectively, along the first axis X.

In detail, the first detection structure 146A comprises two fixed electrodes 150A, 150B each arranged at a distance along the first axis X from a respective mobile electrode, which is fixed with respect to the second mobile mass 10. In particular, here, the mobile electrodes of the first detection structure 146A are formed by two walls 10A, 10B of the second mobile mass 10 that are mutually symmetrical with respect to the second central axis B and face the fixed electrode 150A, 150B, respectively.

The second detection structure 146B comprises two fixed electrodes 151A, 151B, each arranged at a distance along the first axis X from a respective mobile electrode that is fixed with respect to the fourth mobile mass 110. In particular, here, the mobile electrodes of the second detection structure 146B are formed by two walls 110A, 110B of the fourth mobile mass 110, which are mutually symmetrical with respect to the second central axis B and face the fixed electrode 150A, 150B, respectively.

However, the first and the second detection structures 146A, 146B may have a shape different from the one illustrated in FIG. 3. For instance, the number, shape, and arrangement of the fixed electrodes 150A, 150B, 151A, 151B and of the mobile electrodes 10A, 10B, 110A, 110B may vary. In addition or as an alternative, the first and the second detection structures 146A, 146B may be interdigitated capacitors.

The MEMS gyroscope 100 here also comprises the drive contact pads 60, electrically coupled to the first and the second drive structures 145A, 145B, and the detection contact pads 62, electrically coupled to the first and the second detection structures 146A, 146B.

In use, a driving voltage is supplied to the first and the second drive structures 145A, 145B, which causes a movement, for example an oscillation at a resonance frequency of the MEMS gyroscope 100, of the first and the third mobile masses 7, 107 in the primary driving direction Mp, parallel to the first axis X.

The driving voltage may be applied so that the relative movement of the first and the third mobile masses 7, 107 is in phase or in phase opposition. For instance, as indicated by the arrows M1, M2 in FIG. 3, the driving voltage may cause both the first and the third masses 7, 107 to move away from the central anchorage region 20, in two opposite directions of the primary driving direction Mp.

The coupling structures 25A-25D undergo deformation in response to the movement of the first and the third masses 7, 107 each as described above for the coupling structure 25 of the MEMS gyroscope 1 of FIG. 1, causing a movement of the second and the fourth masses 10, 110 in the induced driving direction $M_I$, parallel to the second axis Y.

In detail, here, also the second and the fourth mobile masses 10, 110 move away from the central anchorage region 20, in two opposite directions of the induced driving direction $M_I$, as indicated by the arrows M3, M4 in FIG. 3.

The coupling structures 25A-25D, as described above, are not affected by possible process variabilities of the respective first and second connection arms 33, 34 of the stiff portion 26. Consequently, to a first approximation, the movement of the second and the fourth mobile masses 10, 110 does not have a quadrature component parallel to the first axis X.

Consequently, also the first and the second detection structures 146A, 146B do not detect any variation of capacitance, in the absence of the yaw angular velocity $\Omega_z$.

The MEMS gyroscope 100 thus has a stable output signal associated with detection of the yaw angular velocity $\Omega_z$.

Figure 4:
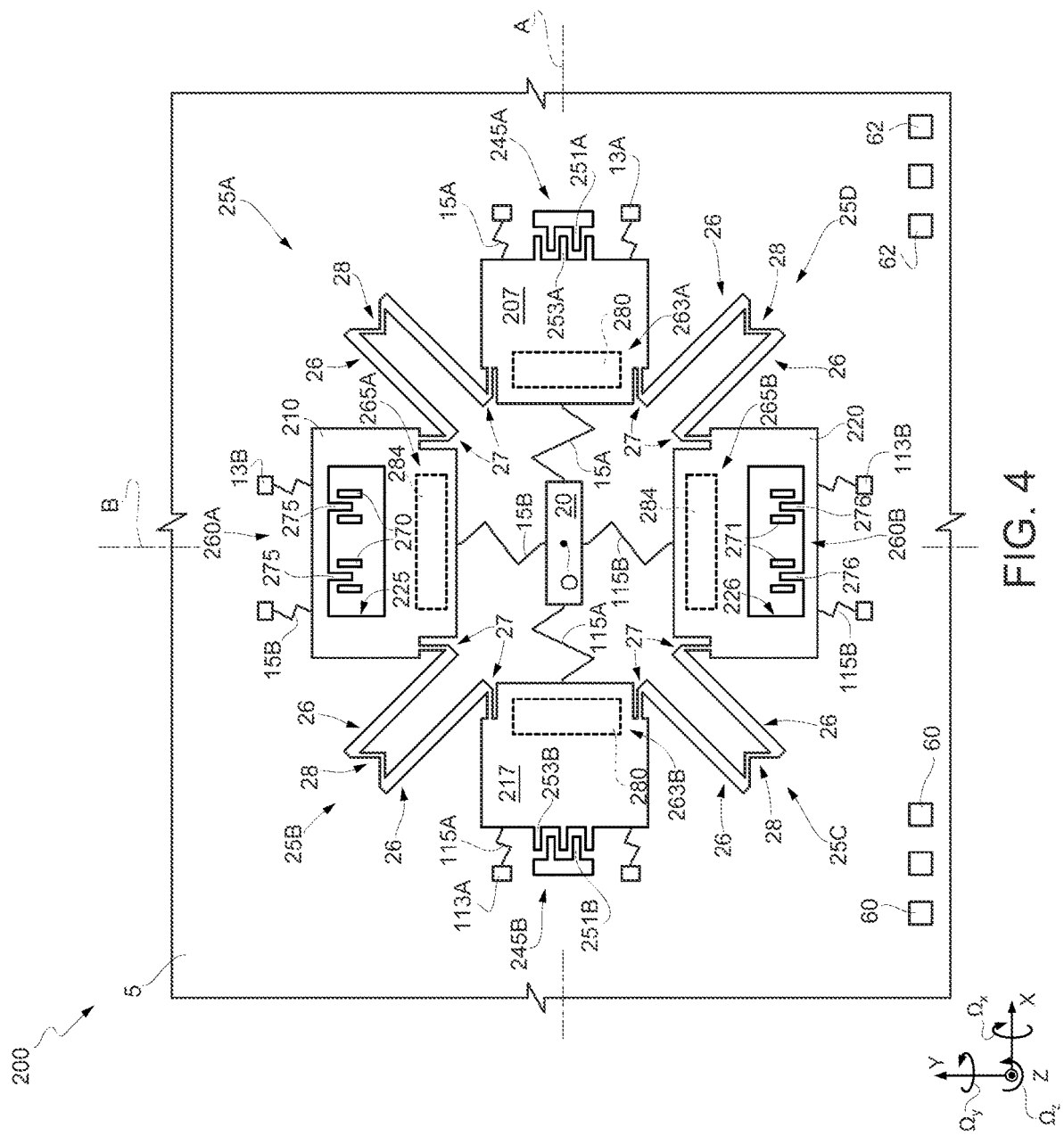
FIG. 4 shows a top view of the present MEMS gyroscope, according to a further embodiment.

FIG. 4 shows a different embodiment of the present MEMS gyroscope, here designated by 200. The MEMS gyroscope 200 is of a triaxial type; i.e., it is configured to detect, in addition to a yaw angular velocity $\Omega_z$ of the MEMS gyroscope 200, also a roll angular velocity $\Omega_y$, about an axis parallel to the second axis Y, and a pitch angular velocity $\Omega_x$, about an axis parallel to the first axis X. The MEMS gyroscope 200 has a general structure similar to the MEMS gyroscope 100 of FIG. 3; consequently, elements in common are designated by the same reference numbers and are not described any further herein.

The MEMS gyroscope 200 has a structure substantially symmetrical with respect to two central axes A, B passing through a center O of the MEMS gyroscope 200 and parallel to the first and the second axes X, Y, respectively.

Also the MEMS gyroscope 200 comprises the substrate 5 and four mobile masses suspended over the substrate 5, here referred to as first mobile mass 207, second mobile mass 210, third mobile mass 217, and fourth mobile mass 220.

The first, the second, the third, and the fourth mobile masses 207, 210, 217, 220 are also here coupled to the central anchorage region 20 and to respective first, second, third, and fourth anchorage regions 13A, 13B, 113A, 113B by respective first, second, third, and fourth flexures 15A, 15B, 115A, 115B.

In this embodiment, the first, the second, the third, and the fourth flexures 15A, 15B, 115A, 115B enable movement of the first, the second, the third, and the fourth mobile masses 207, 210, 217, 220, respectively, along the first, the second, and the third axes X, Y, Z.

Moreover, the MEMS gyroscope 200 also here comprises four coupling structures 25A-25D, which couple together the first, the second, the third, and the fourth mobile masses 207, 210, 217, 220, as described above with reference to the MEMS gyroscope 100 of FIG. 3.

In this embodiment, the second and the fourth mobile masses 210, 220 each delimit laterally a cavity, designated by 225 and 226, respectively. The cavities 225, 226 extend throughout the thickness, along the third axis Z, of the second and the fourth mobile masses 210, 220; i.e., they are of a through type. In practice, here the second and the fourth mobile masses 210, 220 have approximately the shape of a frame.

The MEMS gyroscope 200 comprises a first drive structure and a second drive structure of a capacitive type, here designated by 245A, 245B, coupled to the first and the third mobile masses 207, 217, respectively.

In this embodiment, the first and the second drive structures 245A, 245B are a comb-fingered capacitor. In detail, the first and the second drive structures 245A, 245B each comprise a respective fixed electrode, which is fixed to the substrate 5 and comprises a plurality of protrusions 251A, 251B, and a mobile electrode, which is integral with respect to the first and, respectively, to the third mobile masses 207, 217, each comprising a respective plurality of protrusions 253A, 253B.

In this embodiment, the MEMS gyroscope 200 comprises a first yaw-detection structure 260A and a second yaw-detection structure 260A, 260B, a first and a second roll-detection structure 263A, 263B and a first and a second pitch-detection structure 265A, 265B.

The first and the second yaw-detection structures 260A, 260B are of a capacitive type and are coupled, respectively, to the second and the fourth mobile masses 210, 220. In detail, the first and the second yaw-detection structures 260A, 260B comprise, respectively, first and second fixed yaw electrodes 270, 271 extending parallel to the second axis Y and arranged inside the first cavity 225 of the second mobile mass 210 and inside the second cavity 226 of the fourth mobile mass 220, respectively.

The first and the second yaw-detection structures 260A, 260B further comprise first and second mobile yaw electrodes 275, 276, respectively. The first mobile yaw electrodes 275 extend from the second mobile mass 210, parallel to the second axis Y, towards the inside of the first cavity 225, so as to be interdigitated with the first fixed electrodes 270.

The second mobile yaw electrodes 276 extend from the fourth mobile mass 220, parallel to the second axis Y, towards the inside of the second cavity 226 so as to be interdigitated with the second fixed electrodes 271.

The first and the second roll-detection structures 263A, 263B capacitively couple the first and the third mobile masses 207, 217, respectively, to the substrate 5.

In detail, the first and the second roll-detection structures 263A, 263B each comprise a respective fixed electrode 280, here indicated by a dashed line, fixed to the substrate 5 and arranged at a distance from the first and the third mobile masses 207, 217, respectively, along the third axis Z.

In practice, here, the fixed electrode 280 of the first roll-detection structure 263A and the fixed electrode 280 of the second roll-detection structure 263B are arranged underneath the first and the third mobile masses 207, 217, respectively, facing thereto.

The first and the second pitch-detection structures 265A, 265B capacitively couple the second and the fourth mobile masses 210, 220, respectively, to the substrate 5.

In detail, the first and the second pitch-detection structures 265A, 265B each comprise a respective fixed electrode 284, here indicated by a dashed line, fixed to the substrate 5 and arranged at a distance from the second and the fourth mobile masses 210, 220, respectively, along the third axis Z.

In practice, here, the fixed electrode 284 of the first pitch-detection structure 265A and the fixed electrode 284 of the second pitch-detection structure 265B are arranged, respectively, underneath the second and fourth mobile masses 210, 220, facing thereto.

The first and the second drive structures 245A, 245B and the first and the second yaw-detection structures 260A, 260B may have a shape different from the one illustrated in FIG. 4, for example similar to what is illustrated in FIG. 1 and/or in FIG. 3.

In addition or as an alternative, the first and the second roll-detection structures 263A, 263B and the first and the second pitch-detection structures 265A, 265B may have a shape and arrangements different from the one illustrated in FIG. 4.

The MEMS gyroscope 200 also here comprises the drive contact pads 60, electrically coupled to the first and the second drive structures 245A, 245B, and the detection contact pads 62, here electrically coupled to the first and the second yaw-detection structures 260A, 260B, to the first and the second roll-detection structures 263A, 263B, and to the first and the second pitch-detection structures 265A, 265B.

In use, the coupling structures 25A-25D cause the MEMS gyroscope 200 to have a low quadrature error relative to a yaw detection, as described above.

In addition, the roll-detection structures 263A, 263B and the pitch-detection structures 265A, 265B also enable detection of a roll movement and a pitch movement, respectively.

The roll movement is caused by a roll angular velocity $\Omega_y$ of the MEMS gyroscope 200 about the second axis Y. In fact, in the presence of the roll angular velocity $\Omega_y$, the first and the third mobile masses 207, 217, in oscillation along the first axis X, are affected by a Coriolis force directed along the third axis Z. The first and the third mobile masses 207, 217 are free to move along the third axis Z, and the roll-detection structures 263A, 263B detect the variation of capacitance associated with said movement.

The pitch movement is caused by an angular velocity $\Omega_x$ of the MEMS gyroscope 200 about the first axis X. In fact, in the presence of the pitch angular velocity $\Omega_x$, the second and the fourth mobile masses 210, 220, in oscillation along the second axis Y, are affected by a Coriolis force directed along the third axis Z. The second and the fourth mobile masses 210, 220 are free to move along the third axis Z, and the pitch-detection structures 265A, 265B detect the variation of capacitance associated with said movement.

Figure 5:
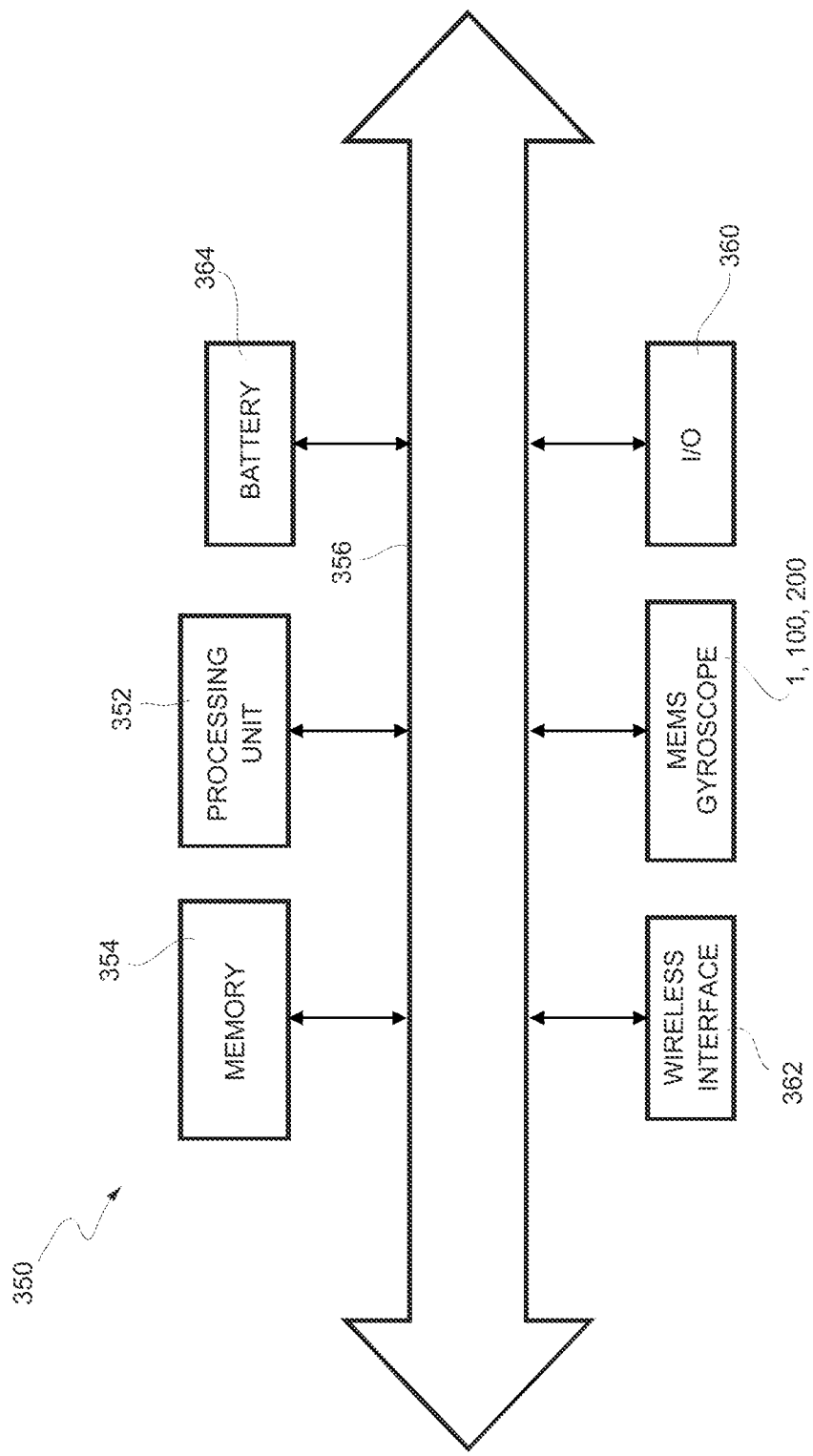
FIG. 5 shows a block diagram of an electronic apparatus incorporating the present MEMS gyroscope.

As illustrated in FIG. 5, the MEMS gyroscope 1, 100, 200 may be incorporated in an electronic apparatus 350, for example a smartphone, a laptop, a wearable device such as a watch or bracelet, a digital camera, etc.

The electronic apparatus 350 comprises a processing unit 352 and a memory 354, operatively coupled to the MEMS gyroscope 1, 100, 200 via a bus 356.

Furthermore, the electronic apparatus 350 may also comprise input/output devices 360 such as a keypad or a display, and a wireless interface 362 and/or a battery 364, which are also coupled to the bus 356.

Finally, it is clear that modifications and variations may be made to the MEMS gyroscope 1, 100, 200 described and illustrated herein, without thereby departing from the scope of the present disclosure, as defined in the annexed claims.

For instance, the present MEMS gyroscope may also be adapted to operate as a gyroscope of a biaxial type.

Moreover, the detection and the drive structures of the MEMS gyroscopes 1, 100, 200 may have a shape and number different from the ones illustrated. The present MEMS gyroscope may also comprise a larger number of drive structures. For instance, the MEMS gyroscope 1 may also comprise a drive structure coupled to the second mobile mass 10 and configured to cause a movement of the second mobile mass 10 in the induced driving direction. For instance, also the MEMS gyroscope 100, 200 may comprise an additional drive structure coupled to the second mobile mass and/or to the fourth mobile mass and configured to cause a movement of the second mobile mass and/or of the fourth mobile mass in the induced driving direction.

The drive and/or the detection structures may have a different operating mechanism, for example of a piezoelectric or electromagnetic type.

For example, the embodiments described may be combined to form further solutions.

A MEMS gyroscope (1; 100; 200) may be summarized as including a substrate (5); a first mass (7; 107; 207, 217) and a second mass (10; 110; 210, 220), the first mass and the second mass being suspended over the substrate and extending, at rest, in a plane of extension (XY) defining a first direction (X) and a second direction (Y) transverse to the first direction; a drive structure (48; 145A, 145B; 245A, 245B) coupled to the first mass and configured, in use, to cause a movement of the first mass in the first direction; and an elastic coupling structure (25; 25A-25D) extending between the first mass and the second mass and configured to couple the movement of the first mass in the first direction (X) with a movement of the second mass in the second direction (Y), wherein the elastic coupling structure includes a first portion (27, 28, 30, 31, 36, 37) having a first stiffness and a second portion (26, 33, 34) having a second stiffness, the second stiffness being greater than the first stiffness.

The first portion (27, 28, 30, 31, 36, 37) of the elastic coupling structure may extend in the first and the second directions, and the second portion (26, 33, 34) may extend in a third direction, in the plane of extension, transverse to the first and the second directions.

The elastic coupling structure (25; 25A-25D) may be configured to cause a movement of the second mass (10; 110; 210, 220) in the second direction (Y), in response to the movement of the first mass (7; 107; 207, 217) in the first direction (X).

The first direction (X) may be perpendicular to the second direction (Y).

The ratio between the second stiffness and the first stiffness May be between 10 and 100.

The first portion (27) of the elastic coupling structure (25; 25A-25D) may include a first arm (30) coupled to the first mass and a second arm (36) coupled to the second mass, the second portion (26) of the elastic coupling structure (25; 25A-25D) extending between the first and the second arms of the first portion of the elastic coupling structure.

The first portion (28) of the elastic coupling structure (25; 25A-25D) may have a joint end (40) and may be formed by a first arm (36) and a second arm (37), the first and the second arms extending from the joint end and being coupled to the second portion (26) of the elastic coupling structure (25; 25A-25D).

The first arm (30, 36) may extend in the first direction (X), and the second arm (31, 37) may extend in the second direction (Y).

The second portion (26) of the elastic coupling structure (25; 25A-25D) may include a first connection arm and a second connection arm (33, 34) extending in a third direction, in the plane of extension, transverse to the first and the second directions, the first connection arm (33) extending from the first arm (30, 36) of the first portion (27, 28) of the elastic coupling structure, the second connection arm (34) extending from the second arm (31, 37) of the first portion (27, 28) of the elastic coupling structure.

The first portion of the elastic coupling structure may have a dimension that may be smaller than a dimension of the second portion of the elastic coupling structure.

The MEMS gyroscope may further include a detection structure (46; 146A, 146B; 260A, 260B) coupled to the second mass (10; 110; 210, 220) and configured, in use, to detect a movement of the second mass in the first direction (X), in the presence of a rotation (Ωz) of the MEMS gyroscope about a fourth direction (Z) perpendicular to the first and the second directions (X, Y).

The MEMS gyroscope may further include a first anchorage region (13A; 113A, 20) and a second anchorage region (13B; 113B, 20) fixed to the substrate (5), and a first flexure (15A; 115A) and a second flexure (15B; 115B), the first flexure (15A; 115A) extending between the first mass (7; 107; 207, 217) and the first anchorage region (13A; 113A, 20), the second flexure (15B; 115B) extending between the second mass and the second anchorage region (13B; 113B, 20).

The MEMS gyroscope (100; 200) may further include a third mass (107; 217) and a fourth mass (110; 220), the third and the fourth masses being suspended over the substrate, wherein the elastic coupling structure may be a first elastic coupling structure (25A), the MEMS gyroscope may further include a second, a third and a fourth elastic coupling structure (25B, 25C, 25D), wherein the second elastic coupling structure extends between the first mass and the fourth mass, the third elastic coupling structure extends between the fourth mass and the third mass, and the fourth elastic coupling structure extends between the second mass and the third mass.

The MEMS gyroscope may have a first and a second axis of symmetry (A, B) parallel to the first and the second directions, respectively, wherein the first mass may be symmetrical to the third mass with respect to the second axis of symmetry, the second mass may be symmetrical to the fourth mass with respect to the first axis of symmetry, the first elastic coupling structure may be symmetrical to the second elastic coupling structure with respect to the second axis of symmetry and to the fourth elastic coupling structure with respect to the first axis of symmetry, and the third elastic coupling structure may be symmetrical to the second elastic coupling structure with respect to the first axis of symmetry and to the fourth elastic coupling structure with respect to the second axis of symmetry.

The MEMS gyroscope (100; 200) may include a second drive structure (145B; 245B) coupled to the third mass and configured, in use, to cause a movement of the third mass in the first direction, and a second detection structure coupled to the fourth mass and configured, in use, to detect a movement of the fourth mass in the first direction (X), in the presence of a rotation (Ωz) of the MEMS gyroscope about a fourth direction (Z) perpendicular to the first and second directions (X, Y).

The MEMS gyroscope (200) may further include a roll-detection structure (263A, 263B) and/or a pitch-detection structure (265A, 265B), wherein the roll-detection structure may be configured to detect a movement of the first mass and/or of the third mass in a fourth direction (Z) perpendicular to the first and the second directions (X, Y), in the presence of a rotation (Ωy) of the MEMS gyroscope about the second direction (Y), and the pitch-detection structure may be configured to detect a movement of the second mass and/or of the fourth mass in the fourth direction, in the presence of a rotation (Ωx) of the MEMS gyroscope about the first direction (X).

The detection structure may be of a capacitive type.

The drive structure may be of a capacitive type.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
 a microelectromechanical system (MEMS) gyroscope including:
  a substrate;
  a first mass and a second mass, the first mass and the second mass being suspended over the substrate and extending, at rest, in a plane of extension defining a first direction and a second direction transverse to the first direction;
  a drive structure coupled to the first mass and configured, in use, to cause a movement of the first mass in the first direction; and
  an elastic coupling structure extending between the first mass and the second mass and configured to couple the movement of the first mass in the first direction with a movement of the second mass in the second direction, and
  wherein the elastic coupling structure includes a first portion having a first stiffness and a second portion having a second stiffness, the second stiffness being greater than the first stiffness.

2. The device according to claim 1, wherein the first portion of the elastic coupling structure extends in the first and the second directions, and wherein the second portion extends in a third direction, in the plane of extension, transverse to the first and the second directions.

3. The device according to claim 1, wherein the elastic coupling structure is configured to cause a movement of the second mass in the second direction, in response to the movement of the first mass in the first direction.

4. The device according to claim 1, wherein the first direction is perpendicular to the second direction.

5. The device according to claim 1, wherein a ratio between the second stiffness and the first stiffness is comprised between 10 and 100.

6. The device according to claim 1, wherein the first portion of the elastic coupling structure comprises a first arm coupled to the first mass and a second arm coupled to the second mass, the second portion of the elastic coupling structure extending between the first and the second arms of the first portion of the elastic coupling structure.

7. The device according to claim 1, wherein the first portion of the elastic coupling structure has a joint end and is formed by a first arm and a second arm, the first and the second arms extending from the joint end and being coupled to the second portion of the elastic coupling structure.

8. The device according to claim 6, wherein the first arm extends in the first direction, and the second arm extends in the second direction.

9. The device according to claim 6, wherein the second portion of the elastic coupling structure comprises a first connection arm and a second connection arm extending in a third direction, in the plane of extension, transverse to the first and the second directions, the first connection arm extending from the first arm of the first portion of the elastic coupling structure, the second connection arm extending from the second arm of the first portion of the elastic coupling structure.

10. The device according to claim 1, wherein the first portion of the elastic coupling structure has a dimension that is smaller than a dimension of the second portion of the elastic coupling structure.

11. The device according to claim 1, further comprising a detection structure coupled to the second mass and configured, in use, to detect a movement of the second mass in the first direction, in the presence of a rotation of the MEMS gyroscope about a fourth direction perpendicular to the first and the second directions.

12. The device according to claim 1, further comprising a first anchorage region and a second anchorage region fixed to the substrate, and a first flexure and a second flexure, the first flexure extending between the first mass and the first anchorage region, the second flexure extending between the second mass and the second anchorage region.

13. The device according to claim 1, further comprising a third mass and a fourth mass, the third and the fourth masses being suspended over the substrate, wherein the elastic coupling structure is a first elastic coupling structure, the MEMS gyroscope further comprising a second, a third and a fourth elastic coupling structure, wherein the second elastic coupling structure extends between the first mass and the fourth mass, the third elastic coupling structure extends between the fourth mass and the third mass, and the fourth elastic coupling structure extends between the second mass and the third mass.

14. The device according to claim 13, wherein the MEMS gyroscope has a first and a second axis of symmetry parallel to the first and the second directions, respectively, wherein the first mass is symmetrical to the third mass with respect to the second axis of symmetry, the second mass is symmetrical to the fourth mass with respect to the first axis of symmetry, the first elastic coupling structure is symmetrical to the second elastic coupling structure with respect to the second axis of symmetry and to the fourth elastic coupling structure with respect to the first axis of symmetry, and the third elastic coupling structure is symmetrical to the second elastic coupling structure with respect to the first axis of symmetry and to the fourth elastic coupling structure with respect to the second axis of symmetry.

15. The device according to claim 13, comprising a second drive structure coupled to the third mass and configured, in use, to cause a movement of the third mass in the first direction, and a second detection structure coupled to the fourth mass and configured, in use, to detect a movement of the fourth mass in the first direction, in the presence of a rotation of the MEMS gyroscope about a fourth direction perpendicular to the first and second directions.

16. The device according to claim 13, further comprising a roll-detection structure and/or a pitch-detection structure, wherein the roll-detection structure is configured to detect a movement of the first mass and/or of the third mass in a fourth direction perpendicular to the first and the second directions, in the presence of a rotation of the MEMS gyroscope about the second direction, and wherein the pitch-detection structure is configured to detect a movement of the second mass and/or of the fourth mass in the fourth direction, in the presence of a rotation of the MEMS gyroscope about the first direction.

17. A device, comprising:
a microelectromechanical system (MEMS) gyroscope including:
a substrate;
a first mobile mass suspended over the substrate;
a second mobile mass suspended over the substrate; and
an elastic coupling structure including:
a first arm coupled to the first mobile mass, the first arm having a first stiffness;
a second arm coupled to the second mobile mass, the second arm having a second stiffness;
a first connection arm coupled to the first arm and extending from the first arm, the first connection arm having a third stiffness greater than the first and second stiffnesses;
a second connection arm coupled to the second arm and extending from the second arm, the second connection arm having a fourth stiffness greater than the first and second stiffnesses; and
a central compliant portion coupled to the first connection arm and coupled to the second connection arm, the central compliant portion extending from the first connection arm to the second connection arm, the central compliant portion having a fifth stiffness less than the third and fourth stiffnesses.

18. The device of claim 17, wherein the central compliant portion includes:
a joint end between the first connection arm and the second connection arm;
a third arm that extends from the first connection arm to the joint end; and
a fourth arm that extends from the second connection arm to the joint end, the fourth arm coupled to the third arm at the joint end.

19. A device, comprising:
a microelectromechanical system (MEMS) gyroscope including:
a substrate;

a first mobile mass suspended over the substrate, the first mobile mass including a plurality of first protrusions that protrude outward from the first mobile mass;

a second mobile mass suspended over the substrate, the second mobile mass including a plurality of second protrusions that protrude outward from the second mobile mass;

a central anchorage region;

a first flexure that couples the first mobile mass to the central anchorage region;

a second flexure that couples the second mobile mass to the central anchorage region;

a first fixed electrode in electrical communication with the plurality of first protrusions;

a second fixed electrode in electrical communication with the plurality of second protrusions; and an elastic coupling structure coupling the first mobile mass to the second mobile mass and configured to, in operation, transfer a motion of the first mobile mass to the second mobile mass.

20. The device of claim 19, wherein the elastic coupling structure includes:

a first arm coupled to the first mobile mass, the first arm configured to, in operation, deform;

a second arm coupled to the second mobile mass, the second arm configured to, in operation, deform;

a first connection arm coupled to the first arm and extending from the first arm;

a second connection arm coupled to the second arm and extending from the second arm; and a central compliant portion coupled to the first connection arm and coupled to the second connection arm, the central compliant portion extending from the first connection arm to the second connection arm, and the central compliant portion configured to, in operation, deform, the central compliant portion including:

a joint end between the first connection arm and the second connection arm;

a third arm that extends from the first connection arm to the joint end; and a fourth arm that extends from the second connection arm to the joint end, the fourth arm coupled to the third arm at the joint end.

* * * * *